United States Patent
Spatt

(12) 
(10) Patent No.: US 6,234,117 B1
(45) Date of Patent: May 22, 2001

(54) QUADRUPED PROTECTIVE GARMENT

(76) Inventor: Joel F. Spatt, 1440 Larchmont Dr., Buffalo Grove, IL (US) 60084

( * ) Notice: Subject to any disclaimer, the term of this patent is extended or adjusted under 35 U.S.C. 154(b) by 0 days.

(21) Appl. No.: 09/349,555

(22) Filed: Jul. 8, 1999

(51) Int. Cl.[7] ................................................. A01K 13/00
(52) U.S. Cl. ................................................ 119/850; 54/79.2
(58) Field of Search .......................... 119/850; 54/79.1, 54/79.2, 79.3, 79.4; D30/145

(56) References Cited

U.S. PATENT DOCUMENTS

| | | | |
|---|---|---|---|
| 102,381 | * 4/1870 | Eager . | |
| D. 368,338 | 3/1996 | Levengood | D30/144 |
| D. 372,563 | 8/1996 | Waugh, Jr. | D330/145 |
| D. 374,315 | 10/1996 | Caditz | D30/145 |
| D. 379,686 | * 6/1997 | Caditz | D30/145 |
| 1,772,827 | 8/1930 | Caster-Udell . | |
| 2,222,705 | * 11/1940 | Conlon . | |
| 2,406,575 | * 10/1946 | Norvig . | |
| 2,417,803 | 3/1947 | De Mar | 54/79 |
| 3,141,443 | 7/1964 | Huey | 119/143 |
| 3,742,679 | * 7/1973 | Jordan | 54/79.1 |
| 3,792,687 | * 2/1974 | Ehrman | 119/868 |
| 3,895,628 | * 7/1975 | Adair | 602/79 |
| 4,355,600 | 10/1982 | Zielinski | 119/143 |
| 4,527,991 | 7/1985 | Msarsa | 604/399 |
| 4,547,165 | * 10/1985 | Scheurer et al. | 441/112 |
| 5,196,240 | * 3/1993 | Stockwell | 427/389.9 |
| 5,359,963 | 11/1994 | Jesse, Jr. et al. | 119/850 |
| 5,447,124 | * 9/1995 | Pollock et al. | 119/850 |
| 5,458,094 | 10/1995 | Proshan | 119/850 |
| 5,463,985 | * 11/1995 | Shover | 119/850 |
| 6,058,890 | * 5/2000 | Harrell | 119/850 |
| 6,070,557 | * 6/2000 | Hibbert | 119/850 |

FOREIGN PATENT DOCUMENTS

| | | |
|---|---|---|
| 255684 | 2/1988 | (EP) . |
| 842423 | 1/1939 | (FR) . |
| WO 95/22462 | 8/1995 | (WO) . |

OTHER PUBLICATIONS

K9 Top Coat Sales Brochure—Publication Date Unknown.

* cited by examiner

*Primary Examiner*—Charles T. Jordan
*Assistant Examiner*—Yvonne R. Abbott
(74) *Attorney, Agent, or Firm*—Fitch, Even, Tabin & Flannery

(57) ABSTRACT

The present invention is directed to a protective garment for quadrupeds that prevents the quadruped from licking or disturbing a treated area or disrupting stitches or sutures. The garment is constructed of a four-way stretch fabric and is designed to allow for easy partial removal of the garment.

18 Claims, 2 Drawing Sheets

QUADRUPED PROTECTIVE GARMENT

The present invention relates to a protective garments for quadrupeds. More specifically, the protective garment of the present invention includes a four-way stretch material that allows the animal freedom of movement and comfort while preventing the animal from disturbing a treated area.

BACKGROUND OF THE INVENTION

Care for animals, after surgery, presents problems. Animals paw, lick and bite at wounds, often tearing out stitches or sutures. Such behavior results in the possibility of re-stitching a wound as well as an increased rate of infection at the wound site. Moreover, constant re-application of bandages to a wound, by taping gauze onto an animal has been difficult. Indeed, medical tape and gauze do not adhere well to the fur of a skittish animal.

In the past an "Elizabethan collar" has been used to prevent an animal from licking at its wounds. This collar, however, limits the animal from moving its head, which restricts its vision and makes it difficult for the animal to eat and drink, thereby causing the animal undue consternation. In addition, the collar neither prevents the animal from pawing at its wounds, nor eliminates the difficulty of reapplying bandages.

Some attempt has been made to prevent an animal from pawing or licking at bandages and wounds by providing body coverings for animals. For example, Caditz, U.S. Des. No. 374,315, teaches a two piece protective garment that covers the head and extends the length of the animal's legs. Similarly, Waugh, U.S. Des. No. 372,563 teaches a multiple piece protective garment, covering only the front portion of the animal. Finally, Zielinski, U.S. Pat. No. 4,355,600 teaches a one piece protective garment fastened only at the back.

These body coverings, heretofore, however, have suffered significant problems. They are difficult to put on and remove, and they often constrain the animal's normal range of motion. Moreover, these body coverings often exacerbate rather than abate the irritation at the wound.

SUMMARY OF THE INVENTION

The present invention describes a protective garment for quadrupeds that prevents the quadruped from licking or disturbing a treated area or disrupting stitches or sutures. This garment includes a single piece of tight-weave, four-way stretch fabric having a top portion, a bottom portion, a tail portion, and side portions. The garment, additionally, includes a head opening, leg openings, and a tail opening. In one aspect of the invention, an additional opening, approximately mid-garment, splits the posterior portion of the garment along the top portion. This mid-garment opening allows the posterior portion to be easily removed. When the quadruped needs to defecate or to urinate, the bottom portion of the garment acts as a hinge, allowing the posterior portion of the garment to be easily removed from the quadruped's back end, tail, and the back legs, while the anterior portion of the garment remains in place. To replace the posterior portion of the garment, the bottom portion swings easily upward, over the quadruped's back legs, tail, and back end.

In an alternative aspect of the invention, the garment splits only around the sides. In another alternative aspect of the invention, the garment includes two completely detachable pieces—a posterior piece and an anterior piece.

The garment employs tight-weave, four-way stretch fabric in order to provide a snug-fitting, yet elastic, garment that denies the quadruped any opportunity to disturb stitches or sutures. The garment's snug fit, smooth texture, and seamless bottom portion reduce irritation and the risk of infection at the wound site. The garment's elasticity facilitates easy removal and replacement of the garment, and allows the quadruped substantial freedom of movement. In addition, tight-weave, four-way stretch fabric resists tearing, thereby increasing the garment's durability. It washes and dries quickly and easily. Moreover, it maintains its shape and fit and defies shrinking, even upon repeated washing and continued wear. In an important aspect, the hydrophobic nature of the fabric provides a garment that resists staining.

In another important aspect of the invention, the particular tight-weave, four-way stretch fabric consists of about an eight (8) ounce tricot weave from about seventy-five (75) percent to about eighty-five (85) percent nylon fiber, and from about fifteen (15) percent to about twenty-five (25) percent segmented polyurethane fiber, such as spandex or elastane. This composition yields elasticity stretch factors of about ninety (90) to about one-hundred twenty (120) percent longitudinally, with a maximum stretch of about two-hundred twenty (220) percent, and about sixty (60) to about one-hundred (100) percent latitudinally, with a maximum stretch of about two-hundred (200) percent. In an alternative aspect of the invention, a polyester fiber may be substituted for the nylon fiber.

In another important aspect of the invention, the garment closes with fasteners, for example, hook and loop fasteners like the fasteners sold under the trademark "Velcro", positioned strategically. A fastener closes the mid-section opening of the garment. Another fastener may be placed behind the head opening, allowing the garment to be easily pulled over the quadruped's head. More fasteners close the tail portion and the posterior portion of the garment. With fasteners closing the posterior portion of the garment, it may be easily removed, while the front portion of the garment remains in place. Once removed, the posterior portion of the garment may be secured beneath the front portion to prevent soiling the garment.

DETAILED DESCRIPTION

FIGS. 1–4 describe various aspects of the present invention. As illustrated in each figure, the garment configuration allows a posterior portion, 11, of the garment to be easily removed. A bottom portion, 3, of the garment acts as a hinge, allowing the posterior portion, 11, of the garment to be easily removed from the quadruped's back end, tail, and the back legs, while the anterior portion, 10, of the garment remains in place. Once removed, the posterior portion, 11, may be securely attached, via fasteners, 12, or tucked beneath the animal. To replace the posterior portion, 11, of the garment, the bottom portion, 3, swings easily upward, over the quadruped's back legs, tail, and back end. In an important aspect, the present invention may includes a protective garment that is a single piece of four way stretch fabric. Alternatively, the protective garment of the invention may include two completely detachable pieces each made of a four way stretch fabric.

Figure 1:
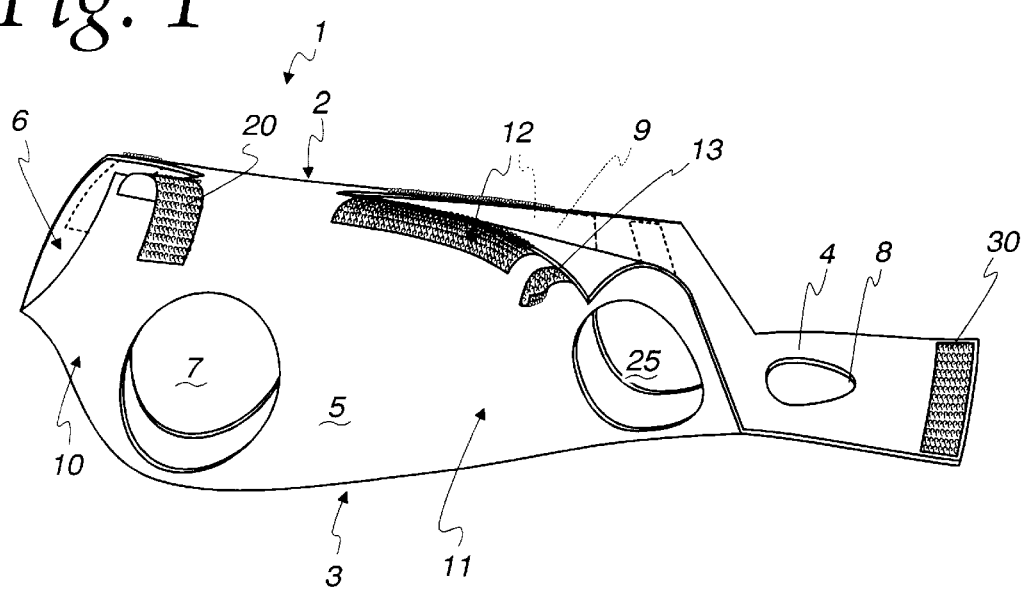
FIG. 1 shows a three dimensional view of the protective garment of the present invention.

FIG. 1 shows a three dimensional perspective of one important aspect of the invention. In this aspect of the invention, the protective garment, 1, includes a single piece of tight-weave, four-way stretch fabric, having a top portion, 2, a bottom portion, 3, a tail portion, 4, and side portions, 5, wherein the garment includes an head opening, 6, front leg openings, 7, rear leg openings, 25, and a tail opening, 8. An additional mid-garment opening, 9, splits the garment along the posterior portion of the top portion, 2, leaving the seamless bottom portion, 3, intact. The edges of the leg openings, 7, the head opening, 6, the tail opening, 8, and the mid-garment opening, 9, may be surged or finished with an elastic seam to prevent fraying. A seamless bottom portion, 3, extending to mid-thorax reduces irritation and the risk of infection at the wound.

In another aspect of the invention, fasteners, 12, close the mid-section opening, 9, of the garment. Another fastener, 20, may be placed behind the head opening, 6, allowing the garment to be easily pulled over the quadruped's head. An additional fasteners, 30, close the tail portion, 4, and the posterior portion, 11, of the garment. A single two-sided fastener, 13, may be used to close the tail portion, 4, and the posterior portion, 11, of the garment. In this aspect of the invention, tail portion, 4, is folded over such that fastener, 30, contacts fastener, 13, to secure the tail portion, 4.

In another important aspect of the invention, the fasteners, 12, 20 and 30 may include hook and loop fasteners such as those sold under the trademark "Velcro". Other fasteners, such as zippers, snaps, and ties are within the scope of the invention. In a very important aspect of the invention, Velcro may be used as the fastener due to its ease of use and its ability to act as a two-sided fastener.

Figure 2:
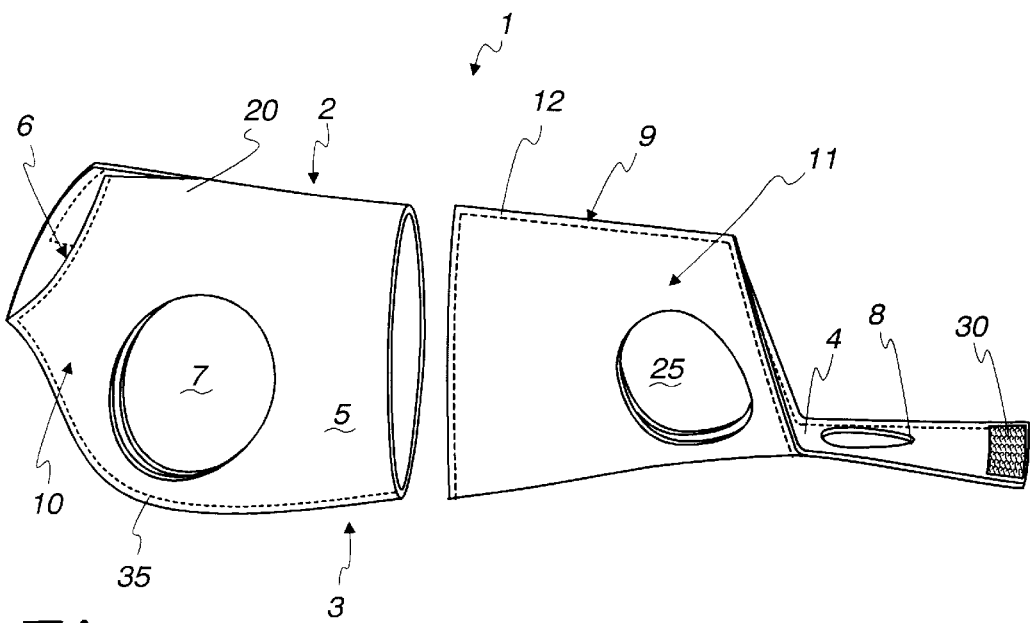
FIG. 2 shows a flat pattern view of the protective garment of the present invention.

FIG. 2 shows a flat or pattern view of the protective garment of the present invention. The protective garment shown in FIG. 2 may includes a single piece of tight-weave, four-way stretch fabric, having a top portion, 2, a bottom portion, 3, a tail portion, 4, and side portions, 5, wherein the garment includes an head opening, 6, front leg openings, 7, and rear leg openings, 25. In an important aspect of the invention, edges of the garment, 35, as shown by dotted lines, may be surged but left open to prevent fraying. In an alternative aspect, the garment shown in FIG. 2 may include two detachable pieces such that the anterior portion, 10, and the posterior portion, 11 are detachable from each other.

In an important aspect of the invention, and as further shown in FIG. 2, a midgarment opening, 9, splits the posterior, 11, side of the top portion, 2. The midgarment opening, 9, is seamed on each side but not sewn together. Fasteners, 12, are placed longitudinally on either side of the midgarment opening, 9. In an important aspect of the invention, the fastener, 12, may be Velcro positioned such that a looped side of the Velcro fastener is on one side of the midgarment opening, 9, and a hooked side of the Velcro fastener is positioned on the opposite side of the opening. Additional fasteners, 20, and 30, may be positioned behind the head opening, 6, and at the tail portion, 4. In the aspect of the invention where the fasteners are Velcro, the Velcro is sewn to the edge of the garment.

Figure 3:
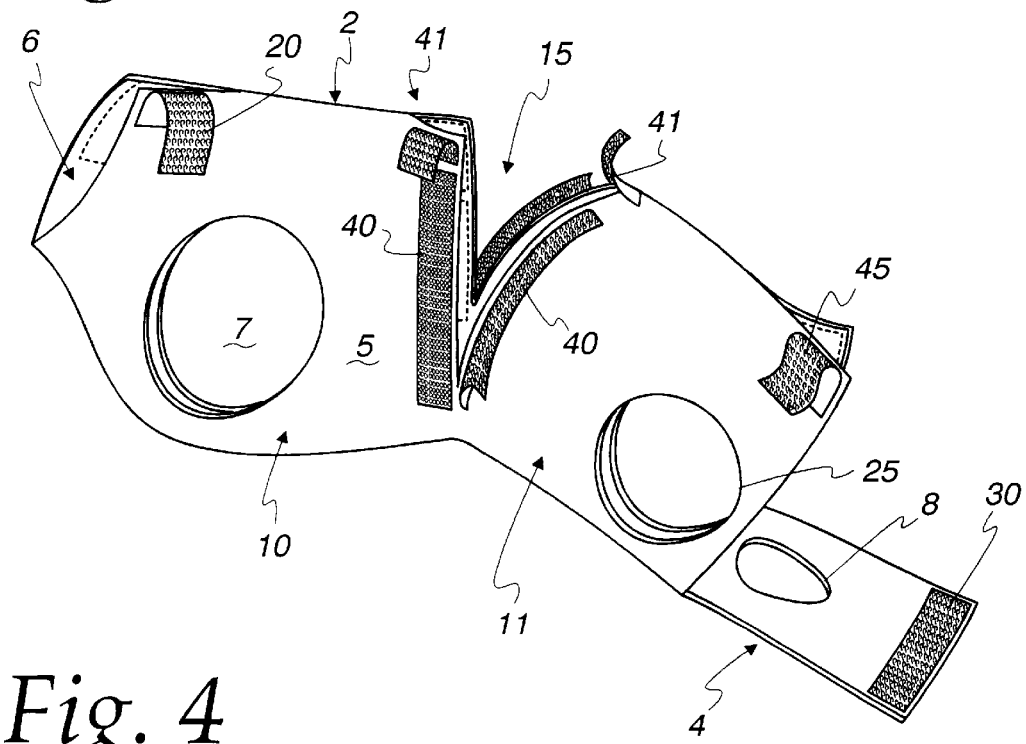
FIG. 3 demonstrates shows a three dimensional view of the protective garment of the present invention having a side opening.
Figure 4:
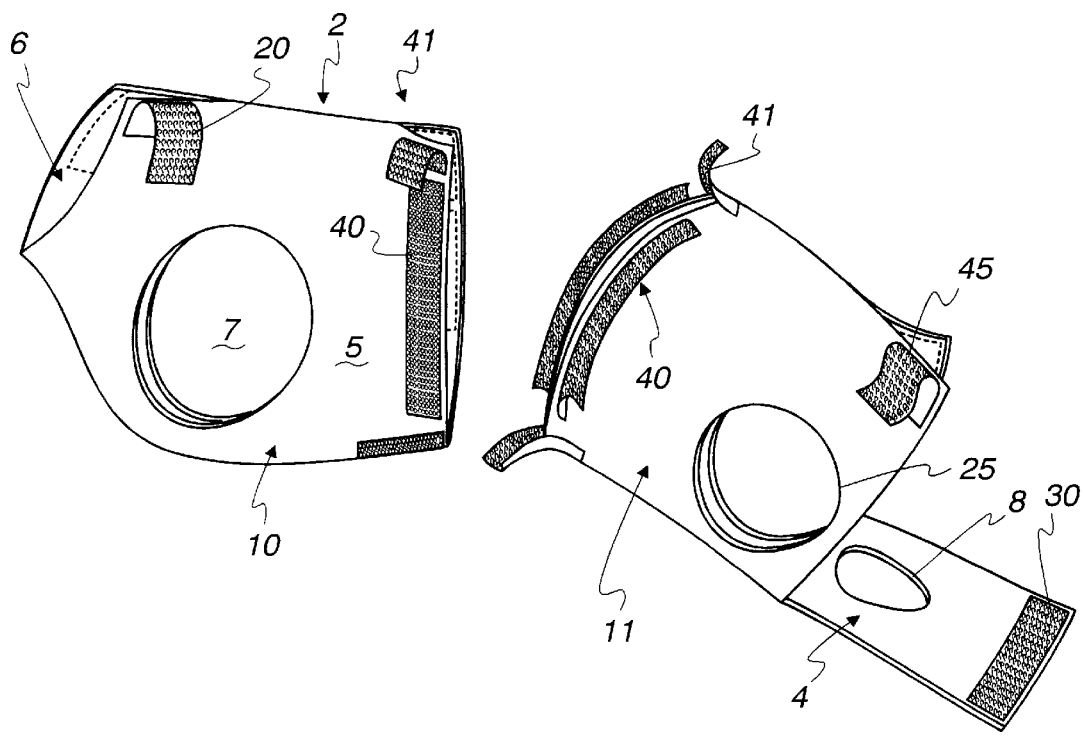
FIG. 4 show the aspect of an aspect of the invention where the protective garment has two pieces.

FIG. 3 illustrates an alternative aspect of the invention where the garment includes a mid-garment opening, 15, split around the sides. The mid-garment opening, 15, is secured with side fasteners, 40 and 41. The garment may also include an additional fastener, 45. In an important aspect, the garment illustrated in FIG. 3 may be a single piece of four-way stretch fabric or two pieces of four-way stretch fabric that can be completely separated into an anterior portion, 10, and a posterior portion, 11.

In an important aspect of the invention, the protective garment, 1, is constructed from a tight-weave, four-way stretch fabric consisting of about an eight (8) ounce tricot weave from about seventy-five (75) to about eighty-five (85) percent nylon fiber, and from about fifteen (15) percent to about twenty-five (25) percent segmented polyurethane fiber, such as spandex or elastane. This fabric composition yields elasticity stretch factors of about ninety (90) to about one-hundred twenty (120) percent longitudinally, with a maximum stretch of about two-hundred twenty (220) percent, and about sixty (60) to about one-hundred (100) percent latitudinally, with a maximum stretch of about two-hundred (200) percent.

The elasticity of this fabric allows the garment to be easily put on and removed from the animal, and allows the animal substantial freedom of movement. Moreover, this fabric retains its shape after repeated washing and continued wear.

In an alternative aspect of the invention, the protective garment may include a weave such as Raschel with the percentages of the other materials remaining the same.

Other configurations of garment openings, to conform to an individual animal's dimensions, though not specifically mentioned, remain within the spirit of the invention.

What is claimed is:

1. A protective garment for quadrupeds comprising:
   a single piece of tight-weave, four-way stretch fabric, having a top portion, a bottom portion, a tail portion, and side portions, wherein the garment includes an head opening, leg openings, and a tail opening; and
   a mid-garment opening, wherein the mid-garment opening splits the garment along the top portion, leaving the bottom portion of the garment intact,
   wherein the tight-weave, four-way stretch fabric yields elasticity factors of about ninety (90) to about one-hundred twenty (120) percent longitudinally, with a maximum stretch of about two-hundred twenty (220) percent, and about sixty (60) to about one-hundred (100) percent latitudinally, with a maximum stretch of about two-hundred (200) percent.

2. A protective garment for quadrupeds according to claim 1, wherein the tight-weave, four-way stretch fabric comprises a tricot weave of about seventy-five (75) to about eighty-five (85) percent nylon fiber, and about fifteen (15) to about twenty-five (25) percent segmented polyurethane fabric, wherein the polyurethane fabric is spandex or elastane.

3. A protective garment for quadrupeds according to claim 1, wherein a posterior portion of the garment can be removed from the quadruped's back end, tail, and back legs, while a front portion of the garment remains in place.

4. A protective garment for quadrupeds according to claim 1, wherein a posterior portion of the garment, once removed, can be secured beneath the quadruped.

5. A protective garment for quadrupeds according to claim 1, wherein the bottom portion of the garment is seamless.

6. A protective garment for quadrupeds comprising:
   a single piece of tight-weave, four-way stretch fabric, having a top portion, a bottom portion, a tail portion, and side portions, wherein the garment includes an head opening, leg openings, and a tail opening;
   a mid-garment opening, wherein the mid-garment opening splits the garment along the top portion, leaving the bottom portion of the garment intact; and fasteners, effective for closing the garment about the quadruped, wherein the tight-weave, four-way stretch fabric yields elasticity factors of about ninety (90) to about one-hundred twenty (120) percent longitudinally, with a maximum stretch of about two-hundred twenty (220) percent, and about sixty (60) to about one-hundred (100) percent latitudinally, with a maximum stretch of about two-hundred (200) percent.

7. A protective garment for quadrupeds according to claim 6, wherein the tight-weave, four-way stretch fabric comprises a tricot weave of about seventy-five (75) to about eighty-five (85) percent nylon fiber, and about fifteen (15) to about twenty-five (25) percent segmented polyurethane fabric, wherein the polyurethane fabric is spandex or elastane.

8. A protective garment for quadrupeds according to claim 6, wherein a posterior portion of the garment can be removed from the quadruped's back end, tail, and back legs, while a front portion of the garment remains in place.

9. A protective garment for quadrupeds according to claim 6, wherein a posterior portion of the garment, once removed, may be secured beneath the quadruped.

10. A protective garment for quadrupeds according to claim 6, wherein the bottom portion of the garment is seamless.

11. A protective garment for quadrupeds comprising:
a single piece of tight-weave, four-way stretch fabric, having a top portion, a bottom portion, a tail portion, and side portions, wherein the garment includes a head opening, leg openings, and a tail opening;
a mid-garment opening, wherein the mid-garment opening splits along the side portions, leaving the bottom portion of the garment intact, and dividing the garment into an anterior portion and a posterior portion; and
fasteners, effective for closing the garment about the quadruped.

12. A protective garment for quadrupeds according to claim 11, wherein the tight-weave, four-way stretch fabric comprises a tricot weave of about seventy-five (75) to about eighty-five (85) percent nylon fiber, and about fifteen (15) to about twenty-five (25) percent segmented polyurethane fabric, wherein the polyurethane fabric is spandex or elastane.

13. A protective garment for quadrupeds according to claim 11, wherein the tight-weave, four-way stretch fabric yields elasticity factors of about ninety (90) to about one-hundred twenty (120) percent longitudinally, with a maximum stretch of about two-hundred twenty (220) percent, and about sixty (60) to about one-hundred (100) percent latitudinally, with a maximum stretch of about two-hundred (200) percent.

14. A protective garment for quadrupeds according to claim 11, wherein the posterior portion of the garment can be removed from the quadruped's back end, tail, and back legs, while the front portion of the garment remains in place.

15. A protective garment for quadrupeds according to claim 11, wherein the posterior portion of the garment, once removed, may be secured beneath the quadruped.

16. A protective garment for quadrupeds according to claim 11, wherein the bottom portion of the garment is seamless.

17. A protective garment for quadrupeds comprising:
two pieces of tight-weave, four-way stretch fabric;
an anterior portion including a top portion, a bottom portion, side portions, as well as an head opening and front leg openings;
a posterior portion including a tail portion, and side portions, as well as back leg openings and a tail opening; and
fasteners, effective for closing the garment about the quadruped, wherein the tight-weave, four-way stretch fabric comprises a tricot weave of about seventy-five (75) to about eighty-five (85) percent polyester fiber, such as nylon, and about fifteen (15) to about twenty-five (25) percent segmented polyurethane fabric, such as spandex or elastane, wherein the tight-weave, four-way stretch fabric yields elasticity factors of about ninety (90) to about one-hundred twenty (120) percent longitudinally, with a maximum stretch of about two-hundred twenty (220) percent, and about sixty (60) to about one-hundred (100) percent latitudinally, with a maximum stretch of about two-hundred (200) percent.

18. A protective garment for quadrupeds according to claim 17, wherein the posterior portion of the garment can be removed from the quadruped's back end, tail, and back legs, while the anterior portion remains in place.

* * * * *